(12) United States Patent
Rotheisler et al.

(10) Patent No.: US 8,746,634 B2
(45) Date of Patent: Jun. 10, 2014

(54) ARTICULATED JIB FOR MOVING A CAMERA DURING THE PRODUCTION OF A MOTION PICTURE

(75) Inventors: Randy Rotheisler, Vancouver (CA); Dean Leonard, Bowen Island (CA)

(73) Assignee: Randy Rotheisler, Vancouver (CA)

( * ) Notice: Subject to any disclaimer, the term of this patent is extended or adjusted under 35 U.S.C. 154(b) by 197 days.

(21) Appl. No.: 13/204,601

(22) Filed: Aug. 5, 2011

(65) Prior Publication Data
US 2013/0034347 A1 Feb. 7, 2013

Related U.S. Application Data

(63) Continuation-in-part of application No. 12/363,633, filed on Jan. 30, 2009, now Pat. No. 8,006,850.

(51) Int. Cl.
*A47F 5/00* (2006.01)
(52) U.S. Cl.
USPC ............. 248/123.2; 248/280.11; 248/281.11
(58) Field of Classification Search
USPC ................. 248/123.11, 123.2, 187.1, 125.7, 248/280.11, 281.11, 292.11; 212/196, 300; 352/243
See application file for complete search history.

(56) References Cited

U.S. PATENT DOCUMENTS

| | | |
|---|---|---|
| 3,434,491 A | 3/1969 | Bily |
| 3,581,769 A | 6/1971 | Haley et al. |
| 3,790,773 A | 2/1974 | Sapper |
| 3,805,834 A | 4/1974 | Bily |
| 3,850,307 A | 11/1974 | Motoda |
| 4,109,688 A | 8/1978 | Jameson |
| 4,142,551 A | 3/1979 | Wilms |
| 4,215,972 A | 8/1980 | Yamasaki et al. |
| 4,339,100 A | 7/1982 | Heller et al. |
| 4,341,242 A | 7/1982 | Hermanson |
| 4,402,646 A * | 9/1983 | Le Rouzo ............... 414/719 |
| 4,418,718 A | 12/1983 | Fusy |
| 4,666,364 A | 5/1987 | Doege et al. |
| 4,741,607 A * | 5/1988 | Heller ................... 359/384 |
| 5,033,705 A | 7/1991 | Reagan |
| 5,192,963 A | 3/1993 | Hill |
| 5,454,042 A | 9/1995 | Drever |

(Continued)

FOREIGN PATENT DOCUMENTS

| | | |
|---|---|---|
| CA | 2653142 | 7/2010 |
| EP | 0131664 | 1/1985 |

(Continued)

OTHER PUBLICATIONS

Email from Ray Tostado to Randy Rotheisler dated Jan. 17, 2011.

(Continued)

*Primary Examiner* — Gwendolyn W. Baxter
(74) *Attorney, Agent, or Firm* — Cameron IP

(57) ABSTRACT

An articulated jib for moving a load is supported on a base and comprises a first jib arm pivotably connected to a base. The first jib arm functions as a bascule and is pivotable about a first axis. There is a first counterweight disposed on the first jib arm. A second jib arm is pivotably connected to the first jib arm and is pivotable about a second axis. A linking rod connects the second jib arm to a lever arm which is also pivotably connected to the base. There is a second counterweight disposed on the lever arm.

20 Claims, 10 Drawing Sheets

(56) References Cited

U.S. PATENT DOCUMENTS

| | | |
|---|---|---|
| 5,531,412 A | 7/1996 | Ho |
| 5,713,545 A | 2/1998 | Nakamura |
| 5,825,536 A | 10/1998 | Yasunaga et al. |
| 6,045,104 A | 4/2000 | Nakamura et al. |
| 6,105,909 A * | 8/2000 | Wirth et al. ............ 248/123.2 |
| 6,646,798 B2 | 11/2003 | Schmidt et al. |
| 6,705,773 B2 | 3/2004 | Fix |
| 6,752,541 B1 | 6/2004 | Dykyj |
| 6,776,488 B2 | 8/2004 | Burbulla |
| 7,189,246 B2 | 3/2007 | Otsuka et al. |
| 7,472,872 B2 * | 1/2009 | Nakamura ............... 248/123.2 |
| 7,942,378 B2 * | 5/2011 | Nakamura .................. 248/564 |
| 8,006,850 B2 | 8/2011 | Rotheisler |

FOREIGN PATENT DOCUMENTS

| | | |
|---|---|---|
| FR | 2 626 957 A | 8/1989 |
| SU | 655639 | 4/1979 |
| WO | PCT/CA2010/000166 | 8/2010 |

OTHER PUBLICATIONS

Image attached to email from Ray Tostado to Randy Rotheisler dated Jan. 17, 2011.

English Translation of SU655639.

Printout from http://cinesyl.fr/Boa/Boa.htm.

* cited by examiner

ARTICULATED JIB FOR MOVING A CAMERA DURING THE PRODUCTION OF A MOTION PICTURE

This application is a continuation-in-part of application Ser. No. 12/363,633 filed in the United States Patent and Trademark Office on Jan. 30, 2009, the disclosure of which is incorporated herein by reference and priority to which is claimed.

BACKGROUND OF THE INVENTION

1. Field of the Invention

The present invention relates to jibs and, in particular, to a simplified, articulated camera jib with improved balance and stability.

2. Description of the Related Art

It is known to provide articulated camera jibs that allow movement about three distinct horizontal axes. Examples are disclosed in U.S. Pat. No. 5,033,705 issued on Jul. 23, 1991 to Reagan and U.S. Pat. No. 5,192,963 issued on Mar. 9, 1993 to Hill. These jibs allow a camera to be moved without requiring movement of a base which supports the jib. However, these jibs typically use timing belts or chain drives to ensure synchronization of all the various elements in order to provide balance and stability. The timing belts or chain drives add undesired structure and weight to the jib.

To overcome the above-mentioned shortcomings of timing belts and chain drives, some articulated camera jibs use linking rods to ensure synchronization of all the various elements. An example of such a jib is disclosed in U.S. Pat. No. 5,531,412 issued on Jul. 2, 1996 to Ho. However, the jib disclosed by Ho has a complex structure including four interdependent "four-linking mechanisms". Each of the "four-linking mechanisms" comprises two pairs of parallel linking bars. There is accordingly a need for a simplified, articulate jib with improved balance and stability.

SUMMARY OF THE INVENTION

It is an object of the present invention to provide a simplified, articulated jib with improved balance and stability. In particular, it is an object of the present invention to provide an improved articulated jib in which each jib arm is independently counterbalanced.

There is accordingly provided an articulated jib for moving a load. The jib is supported on a base and comprises a first jib arm pivotably connected to the base. The first jib arm functions as a bascule and is pivotable about a first axis. There is a first counterweight mounted on the first jib arm. A second jib arm is pivotably connected to the first jib arm and is pivotable about a second axis. A linking rod connects the second jib arm to a lever arm which is also pivotably connected to the base. There is a second counterweight mounted adjacent to a distal end of the lever arm. The jib base may be rotatably mounted on a tripod.

In one embodiment the first jib arm is connected to the second jib arm by a connector plate. The first jib arm includes two parallel frame bars with each of the frame bars being pivotably connected to the connector plate and pivotably connected to the base so as to form a parallelogram link mechanism. A full length of the linking rod extending between its points of connection with the second jib arm and the lever arm is equal to or less than a full length of each of the frame bars of the first jib arm between its respective points of connection with the second jib arm and the base. The linking rod may be an adjustable length linking rod. The lever arm may include two parallel frame bars and a link connecting said parallel frame bars at distal ends thereof. Each of the parallel frame bars of the lever arm may be pivotably connected to the link and pivotably connected to the base at a proximal end thereof so as to form a parallelogram link mechanism. There may be an extension arm extending from the link at the distal end of the lever arm and the second counterweight may be mounted on the extension arm.

In another embodiment the first jib arm is connected to the second jib arm by a connector plate and the first jib arm is further supported by a mounting plate which is disposed between the base and the first counterweight. The first jib arm includes two parallel frame bars with each of the frame bars being pivotably connected to the connector plate and pivotably connected to the mounting plate so as to form a parallelogram link mechanism. A full length of the linking rod extending between its points of connection with the second jib arm and the lever arm is equal to or less than a full length of each of the frame bars of the first jib arm between its respective points of connection with the connector plate and the mounting plate. The linking rod may be an adjustable length linking rod. The lever arm may include two parallel frame bars and a link connecting said parallel frame bars at distal ends thereof. Each of the parallel frame bars of the lever arm may be pivotably connected to the link at a distal end thereof and pivotably connected to the base at a proximal end thereof so as to form a parallelogram link mechanism. There may be an extension arm extending from the link at the distal end of the lever arm and the second counterweight may be mounted on the extension arm.

The load is preferably equipment used in the film industry such as a camera. However, the jib may also be used to move other types of loads such as magnifying lenses or medical equipment such as operating microscopes.

The jib provides a wide range of movement allowing the load to be moved horizontally, vertical, in a circle or any combination thereof.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
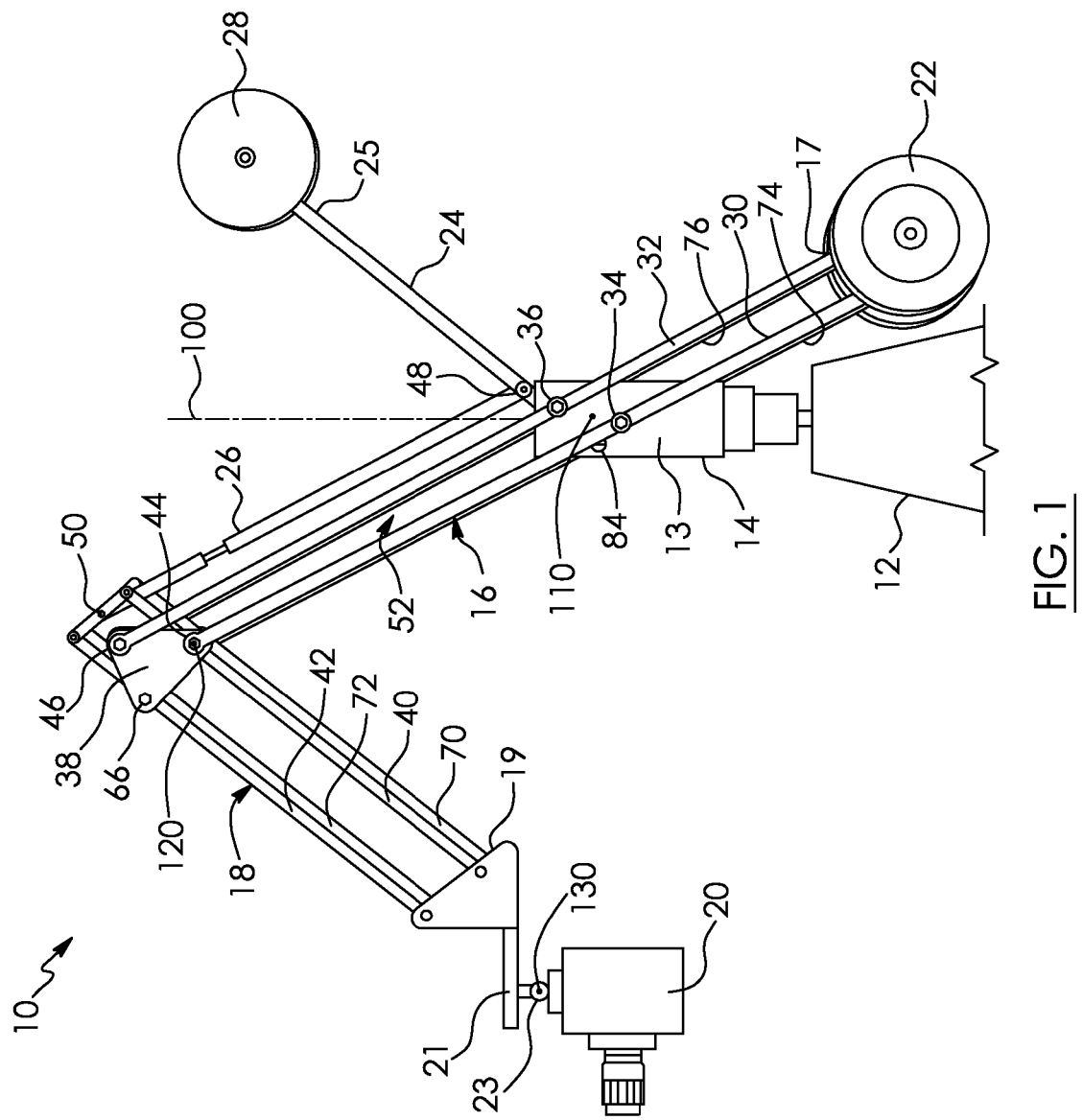
FIG. 1 is an elevation side view of a first embodiment of an improved articulated jib in a first position.
Figure 4:
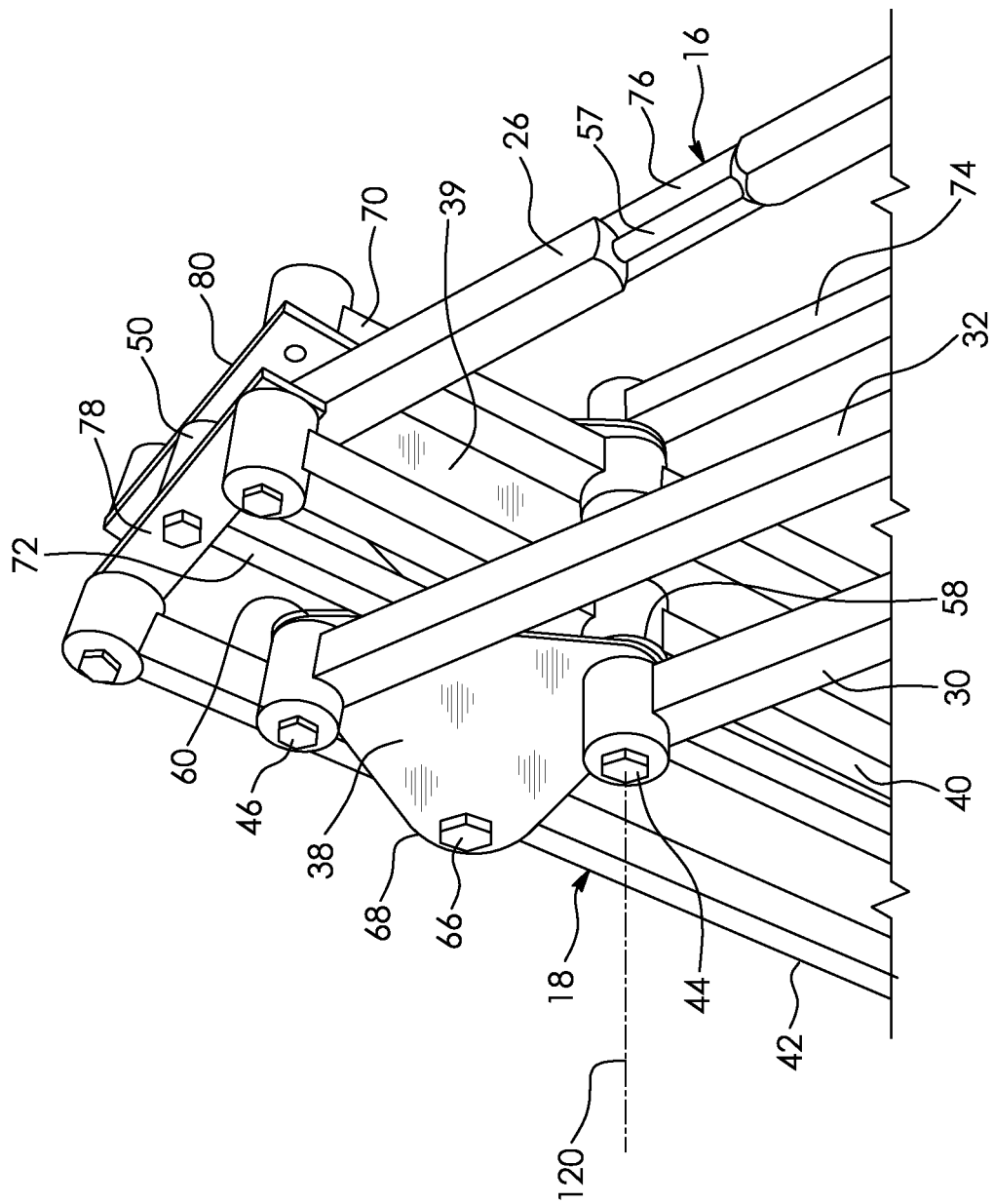
FIG. 4 is an enlarged, fragmentary perspective view of a connector plate between the first jib arm and the second jib arm of the articulated jib of FIG. 1.

Referring to the drawings and first to FIG. 1 this shows a first embodiment of an articulated jib 10 rotatably mounted on a tripod 12, which is shown in fragment. The jib 10 is rotatable on the tripod 12 about a vertical axis 100. In this example, a base 14 supports the jib 10 and functions as a fulcrum. A first jib arm 16 is defined by four longitudinal frame bars 30, 32, 74, and 76 which are aligned in parallel, in a generally quadrate formation (as best shown in FIG. 4). The first jib arm 16 is pivotably connected to the base 14 by pivot pins 34 and 36, and the first jib arm 16 functions as a bascule to allow movement about a first generally horizontal pivot axis 110. A second jib arm 18 is also defined by four longitudinal frame bars 40, 42, 70, 72 which are aligned in parallel, in a generally quadrate formation (as best shown in FIG. 4). The second jib arm 18 is pivotably connected to the first jib arm 16 by a pin 44 to allow movement about a second generally horizontal pivot axis 120. A camera 20 is mounted on a platform 21 at a distal end 19 of the second jib arm 18. The camera 20 is pivotable about a support 23 to allow movement about a third horizontal pivot axis 130.

A first counterweight 22 is disposed at an end 17 of the first jib arm 16 opposite the second jib arm 18 and camera 20. The first counterweight 22 counterbalances the second jib arm 18 and the camera 20 as the first jib arm 16 pivots about the first horizontal pivot axis 110. A second counterweight 28 is disposed at a distal end 25 of a lever arm 24. The lever arm 24 is pivotably connected to the base 14 by a pivot pin 84. A linking rod 26 connects the lever arm 24 to the second jib arm 18. The second counterweight 28 counterbalances the camera 20 as the second jib arm 18 pivots about the second horizontal pivot axis 120.

In FIG. 1 only a first side of the jib 10 is shown in detail. A second side of the jib 10 is a mirror image of the first side of the jib 10. For example, frame bars 30 and 32 of the first jib arm 16 are on the first side of the jib 10 while frame bars 74 and 76 are on the second side of the jib 10. Likewise, frame bars 40 and 42 of the second jib arm 18 are on the first side of the jib 10 while frame bars 70 and 72 are on the second side of the jib 10. Only the first side of the jib 10 will be described in detail herein. It will be understood that the second side of the jib 10 has a substantially similar structure and functions in a substantially similar manner. Two of the longitudinal frame bars 30 and 32 of the first jib arm 16 are each pivotably connected to a lateral side 13 of the base 14 by pivot pins 34 and 36, respectively. The pivot pins 34 and 36 are not vertically aligned with one another having regard to the vertical axis 100 about which the jib 10 rotates. A triangular connector plate 38 is mounted on the second jib arm 18 and extends between two of the longitudinal frame bars 40 and 42 of the second jib arm 18. The longitudinal frame bars 30 and 32 of the first jib arm 16 are connected to the triangular connector plate 38 by pins 44 and 46, respectively. The other two longitudinal frame bars 74 and 76 of the first jib arm 16 are coupled to the second side of the jib 10 in a similar manner. The linking rod 26 is connected to the lever arm 24 by a pivot pin 48. The linking rod 26 is also connected to the second jib arm 18 at a pivot shaft 50.

Figure 2:
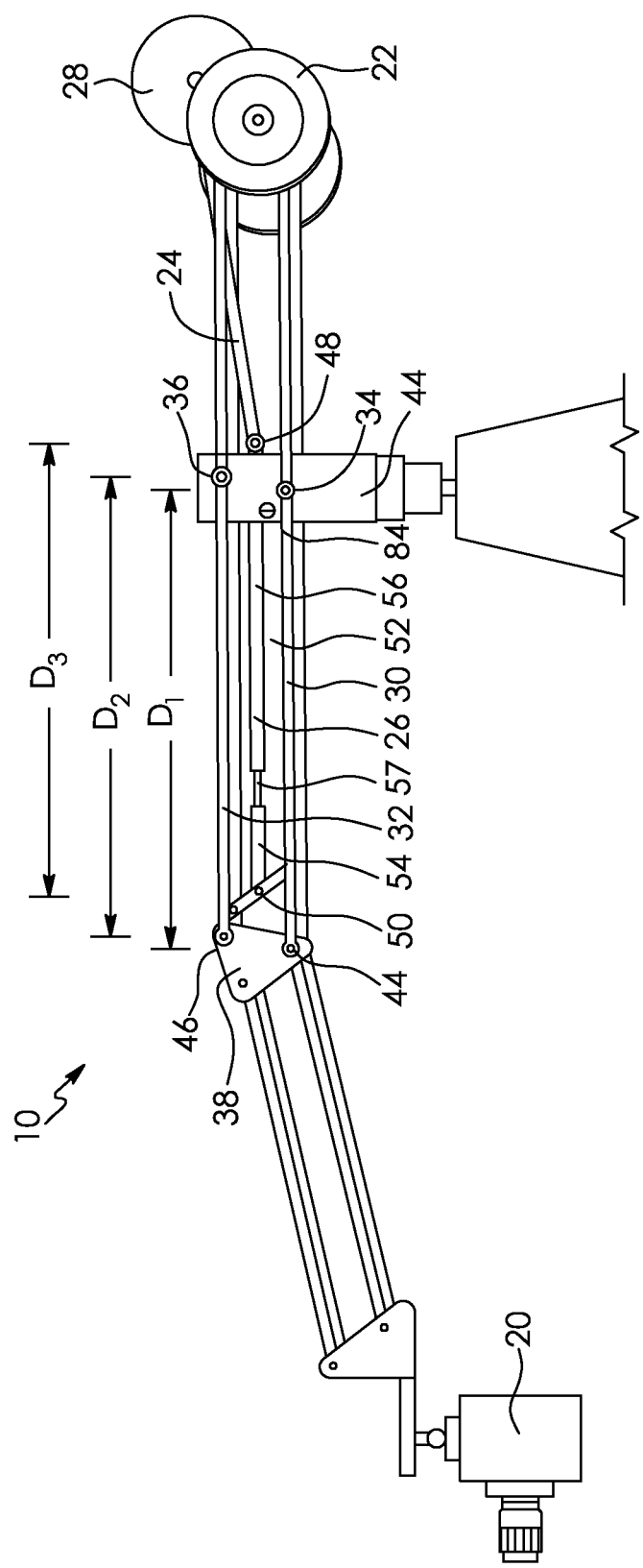
FIG. 2 is another elevation side view of the articulated jib of FIG. 1 in a second position.
Figure 6:
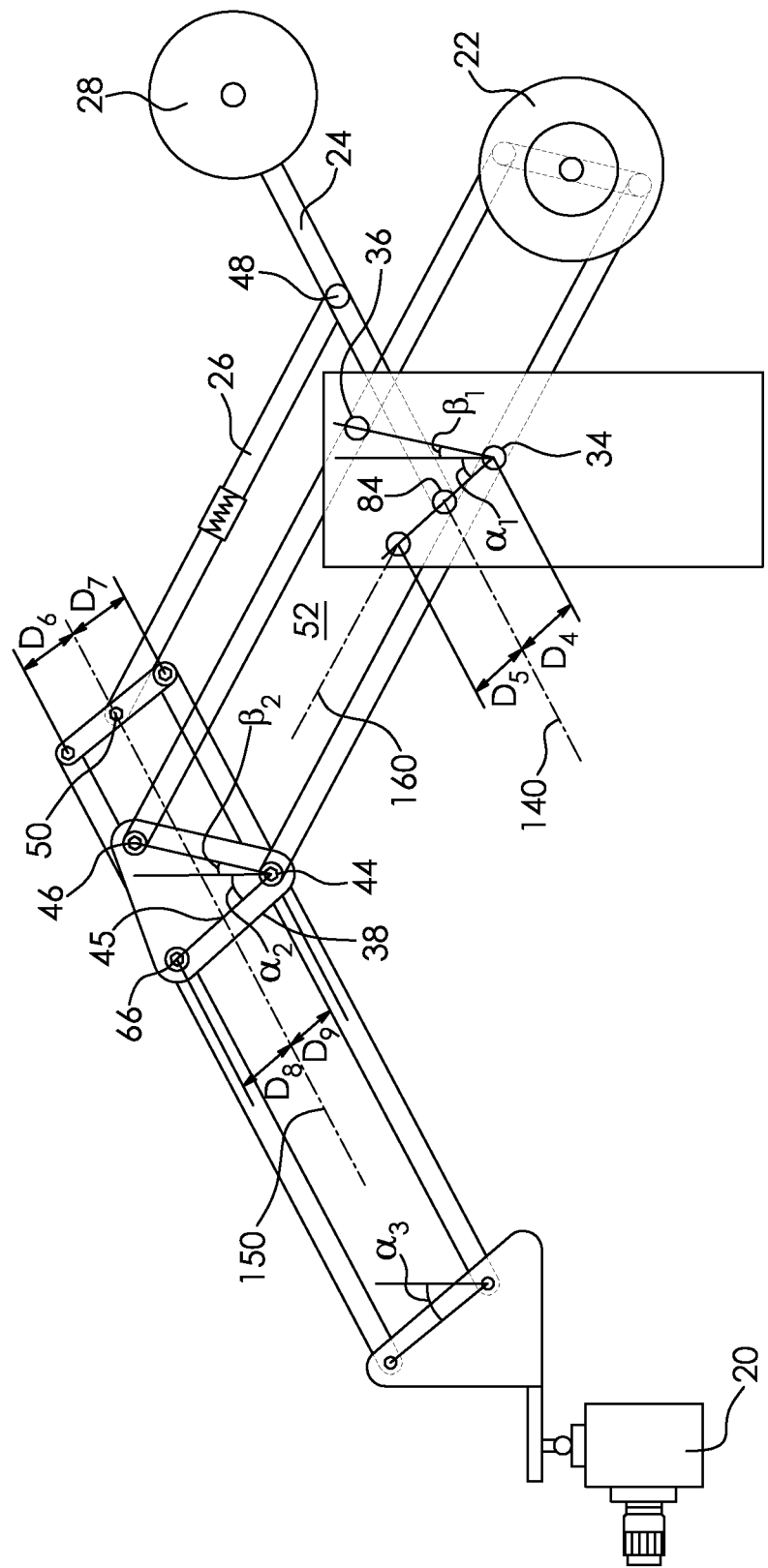
FIG. 6 is a partly schematic, elevation side view of the articulated jib of FIG. 1.

As best shown in FIG. 2, the full distance $D_1$ between the pins 34 and 44, which are coupled to the longitudinal frame bar 30 of the first jib arm 16, is substantially equal to the full distance $D_2$ between the pivot pins 36 and 46, which are coupled to the longitudinal frame bar 32 of the first jib arm 16. The pins 34, 36, 44 and 46 define the corners of a parallelogram link mechanism 52 which is best shown in FIG. 6. As seen by comparing FIGS. 1 and 2, the first parallelogram link mechanism 52 changes shape as the first jib arm 16 pivots about the base 14. This ensures that the first counterweight 22 moves appropriately in the horizontal and vertical directions to counterbalance the second jib arm 18 and the camera 20 through a range of motion.

In FIG. 6 angles $\alpha_1$ and $\alpha_2$ are substantially equal, and angles $\beta_1$ and $\beta_2$ are substantially equal. Angle $\alpha_3$ is also substantially equal to angles $\alpha_1$ and $\alpha_2$. The jib 10 is designed to maintain angles $\alpha_1$, $\alpha_2$, and $\alpha_3$ equal in response to pivoting by either the first jib arm 16 or second jib arm 18. As a result, a longitudinal axis 140 of the lever arm 24 is maintained substantially parallel to a longitudinal axis 150 of the second jib arm 18. This ensures that the second counterweight 28 moves appropriately in the horizontal and vertical directions to counterbalance the camera 20 through the range of motion. Distances $D_4$ to $D_9$ are all substantially equal to each other. A longitudinal axis 160 of the first jib arm 16 is also shown in FIG. 6. Since operation of a parallelogram link mechanism, or parallel link, is well known in the art and is discussed in U.S. Pat. No. 5,713,545 issued to Nakamura on Feb. 3, 1998, the full disclosure of which is incorporated herein by reference, operation of the parallelogram link mechanism 52 is not discussed in further detail herein.

Referring back to FIG. 2, the full distance $D_3$ between the pivot pin 48, which connects the linking rod to the lever arm 24, and the pivot shaft 50, which connects the linking rod 26 to the second jib arm 18, is equal to or less than both distances $D_1$ and $D_2$. In this example, the linking rod 26 is an adjustable length linking rod which comprises two portions 54 and 56 which are threadedly connected by a threaded member 57 disposed on an end of a first one of the portions 54 of the linking rod 26. Changing the amount to which the threaded member 57 is threadedly received by a second one of the portions 56 of the linking rod 26 enables distance $D_3$ to be changed to account for variances in camera weights. In other embodiments, telescoping portions or another means may be used to change the distance $D_3$. The underlying principle being that a length of the linking rod 26 between its points of connection with the second jib arm 18 and the lever arm 24 ($D_3$) is equal to or less than a length of the frame bars 30, 32, 74, and 76 of the first jib arm 16 between their respective points of connection with the connector plate 38 and the base 14 ($D_1$ and $D_2$).

Figure 3:
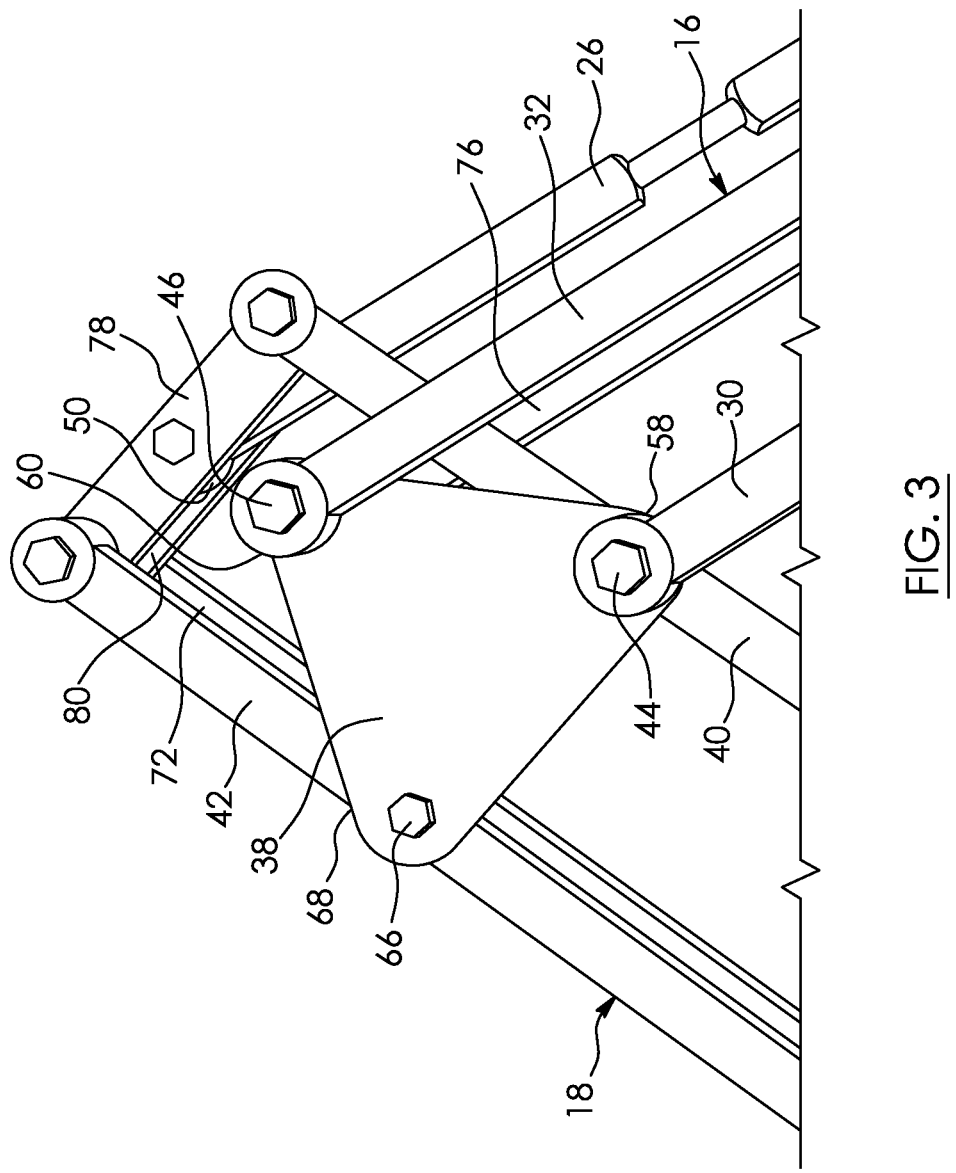
FIG. 3 is an enlarged, fragmentary elevation view of a connection between a first jib arm and a second jib arm of the articulated jib of FIG. 1.

Referring now to FIGS. 3 and 4 the pivotable connection between the first jib arm 16 and the second jib arm 18 is shown in greater detail. Longitudinal frame bars 30 and 32 of the first jib arm 16 are connected to the triangular connector plate 38 by corresponding pins 44 and 46 adjacent respective vertices 58 and 60 of the triangular connector plate. As best shown in FIG. 4, longitudinal frame bars 40 and 42 of the second jib arm 18 are also connected to the triangular connector plate 38. A first one of the longitudinal bars 40 of the second jib arm 18 is pivotably mounted on the pin 44 which also connects the first one of the longitudinal frame bars 30 of the first jib arm 16 to the triangular connector plate 38. This connection allows the second jib arm 18 to pivot about the second axis 120. The triangular connector plate 38 is also pivotably mounted on the pin 44 between the first and second jib arms 16 and 18. The second jib arm 18 and the triangular connector plate 38 are independently pivotable. A pin 66 connects a third vertex 68 of the triangular connector plate 38 to a second one of the longitudinal frame bars 42 of the second jib arm 18.

The second jib arm 18 also has a pair of end links 78 and 80, each of which links a respective corresponding two of the longitudinal frame bars 40, 42 and 70, 72 of the second jib arm 18. The pivot shaft 50 which connects the linking rod to the second jib arm 18 extends between the end links 78 and 80.

The other two longitudinal frame bars 70 and 72 of the second jib arm 18 are coupled to a corresponding triangular connector plate 39 on the second side of the jib 10 in a similar manner, as are the other two longitudinal frame bars 74 and 76 of the first jib arm 16.

Figure 5:
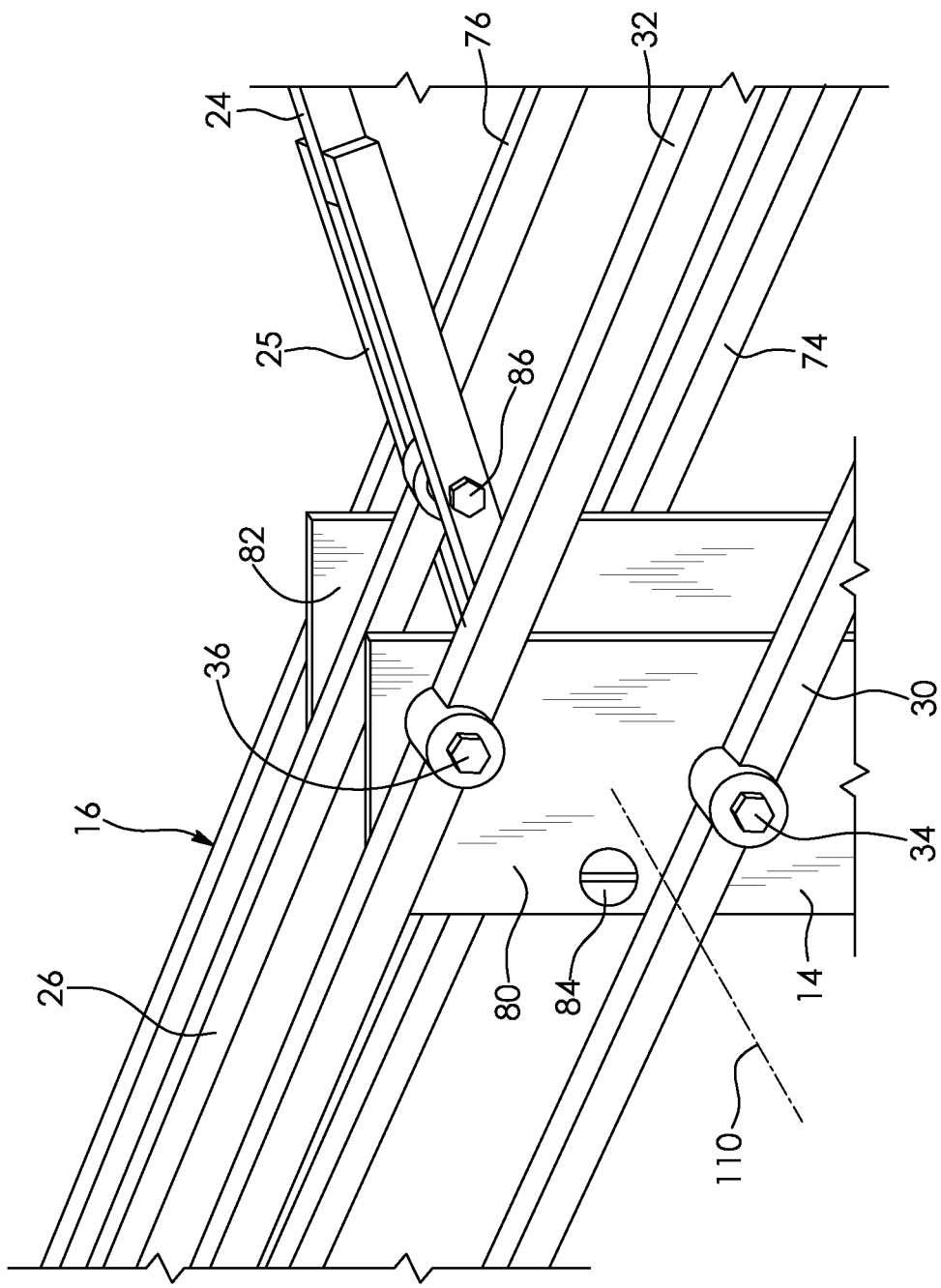
FIG. 5 is an enlarged, fragmentary perspective view of a fulcrum of the articulated jib of FIG. 1.

Referring now to FIG. 5, the pivotable connection between the first jib arm 16 and the base 14 is shown in greater detail. The base 14 has a U-shape with spaced-apart lateral side walls 80 and 82. Two of the longitudinal frame bars 30 and 32 are pivotably connected to an outer side of a first one of the lateral side walls 80 by corresponding pivot pins 34 and 36. The other two of the longitudinal frame bars 74 and 76 are pivotably connected to an outer side of a second one of the lateral side walls 82 by corresponding pivot pins (not shown). FIG. 5 also shows the pivotable connection between the base 14 and the lever arm 24. The lever arm 24 has a bifurcated end portion 25 which is pivotably mounted on a pivot shaft 84 that extends between the lateral side walls 80 and 82 of the U-shaped base 14. The linking rod 26 is pivotably connected to the bifurcated end portion 25 of the lever arm 24 by a pin 86.

Figure 7:
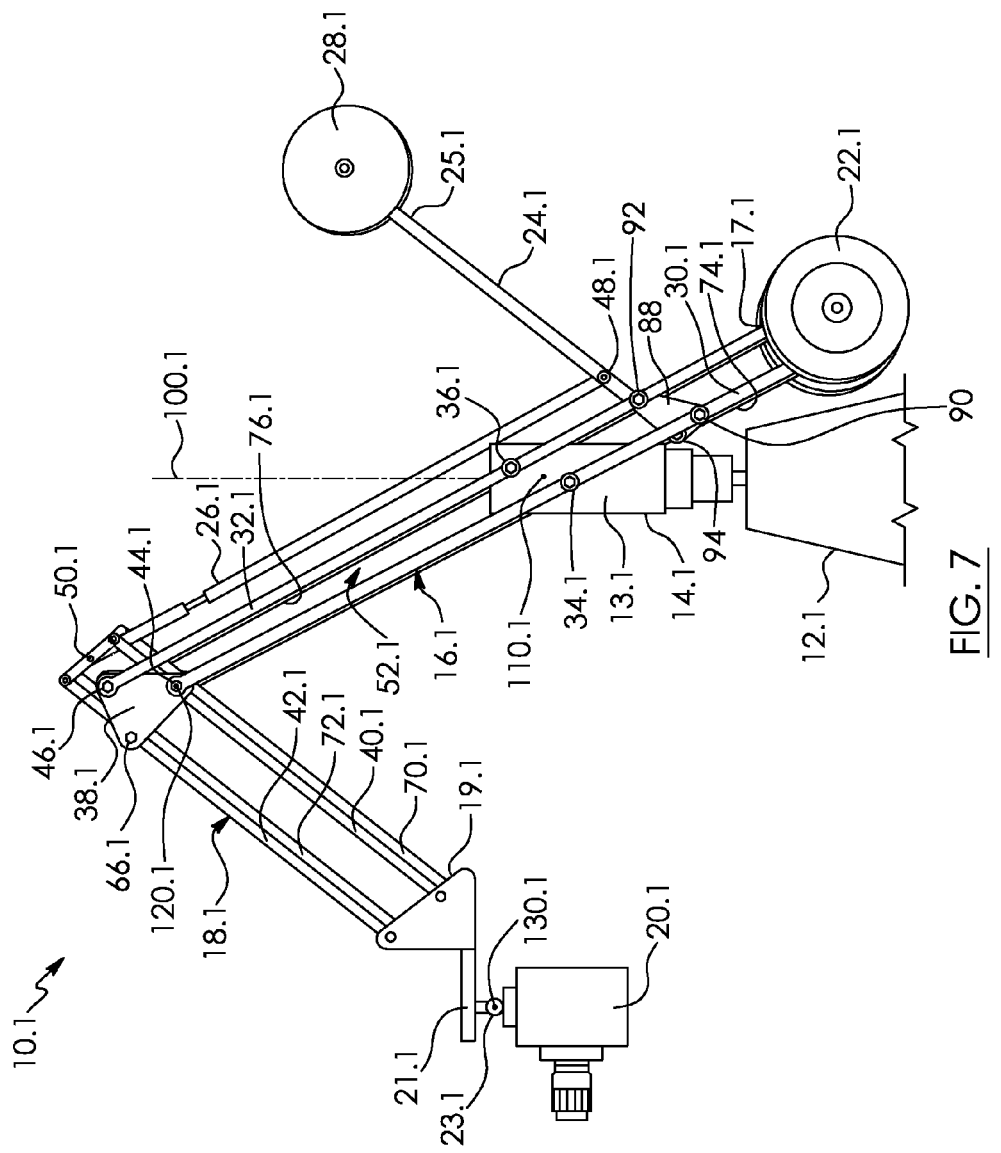
FIG. 7 is an elevation side view of a second embodiment of an improved articulated jib.
Figure 8:
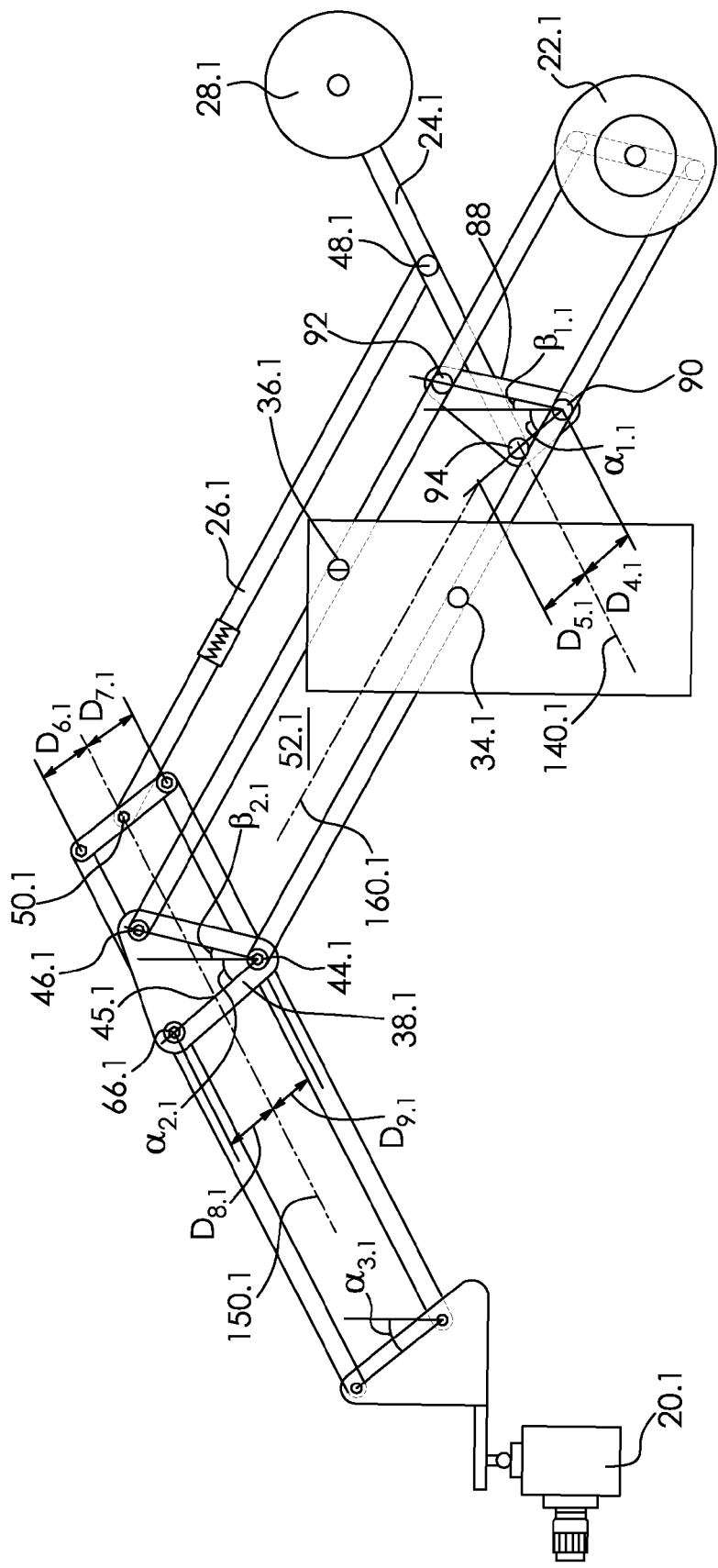
FIG. 8 is a partly schematic, elevation side view of the articulated jib of FIG. 7.

Referring now to FIGS. 7 and 8 a second embodiment of an improved articulated jib 10.1 is shown. In FIGS. 7 and 8 like parts have been given like reference numerals as in FIGS. 1 and 6 with the additional numerical designation "0.1". The second embodiment of the jib 10.1 is generally similar to the first embodiment of the jib 10 with the notable exception that the second embodiment of the jib 10.1 further includes a mounting plate 88 disposed on the first jib arm 16.1 on each side of the jib 10.1 between the base 14.1 and the first counterweight 22.1, i.e. aft of the base 14.1. Two of the longitudinal frame bars 30.1 and 32.1 of the first jib arm 16.1 on a first side of the jib 10.1 are pivotably connected to the mounting plate 88 by pins 90 and 92, respectively. The pins 90 and 92 together with pivot pins 44.1 and 46.1, which connect the longitudinal frame bars 30.1 and 32.1 of the first jib arm 16.1 to the connector plate 38.1, define corners of a parallelogram link mechanism 52.1 of the jib 10.1.

It will be understood that in FIGS. 7 and 8 only a first side of the jib 10.1 is shown in detail and a second side of the jib 10.1 is a minor image of the first side of the jib 10.1. For example, frame bars 30.1 and 32.1 of the first jib arm 16.1 are on the first side of the jib 10.1 while frame bars 74.1 and 76.1 are on the second side of the jib 10.1. Likewise, the mounting plate 88 is on the first side of the jib 10.1 while a corresponding mounting plate (not shown) to which the frame bars 70.1 and 72.1 are connected is on the second side of the jib 10.1. Only the first side of the jib 10.1 has been described in detail herein. It will be understood that the second side of the jib 10.1 has a substantially similar structure and functions in a substantially similar manner.

The second embodiment of the jib 10.1 also differs from the first embodiment of the jib 10 in that the lever arm 24.1 is connected to the mounting plate 88 by pivot shaft 94 which, in this example, extends between the mounting plate 88 on the first side of the jib 10.1 and a mounting plate (not shown) on a second side of the jib 10.1. The lever arm 24.1 is disposed between the mounting plates.

Figure 9:
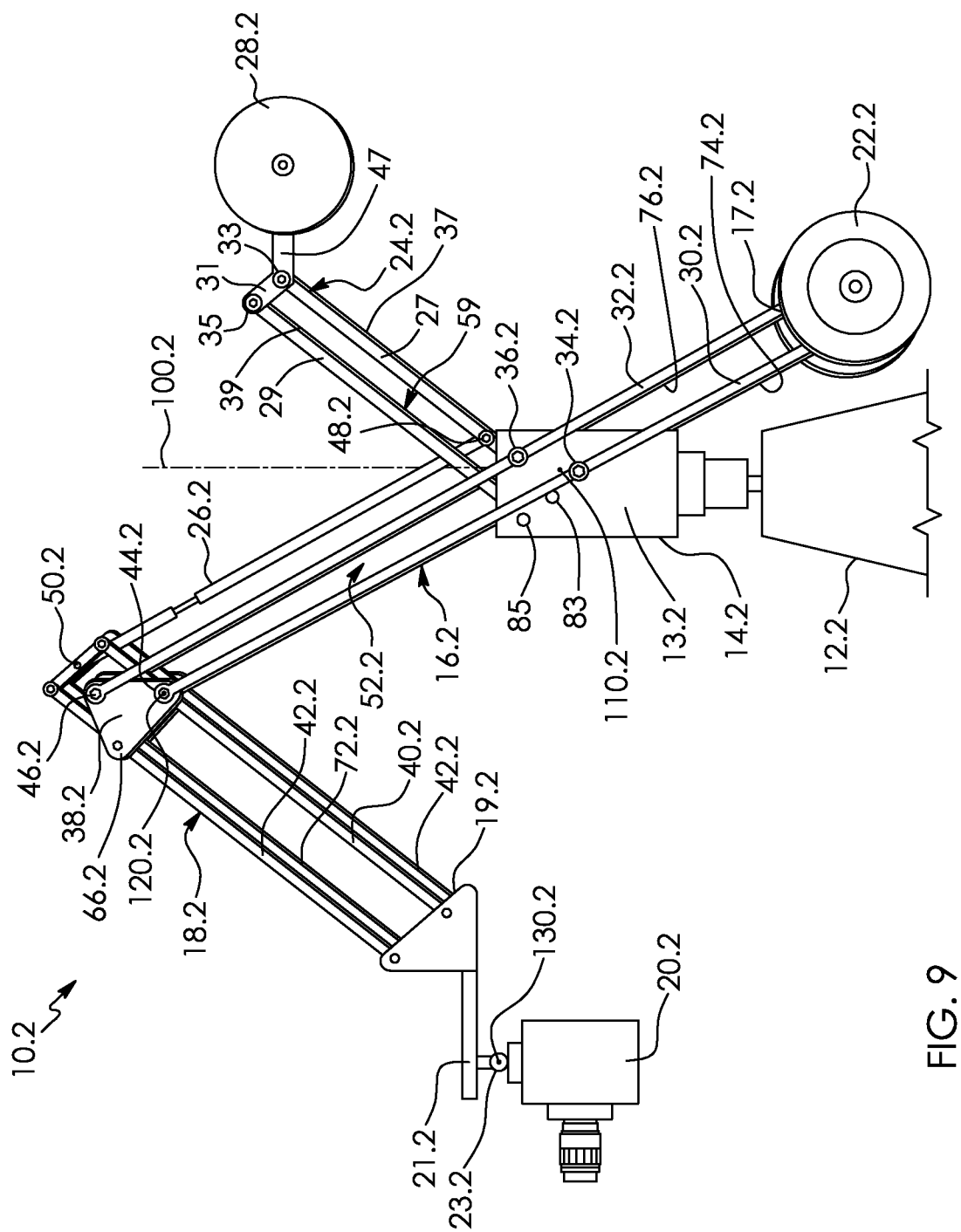
FIG. 9 is an elevation side view of a third embodiment of an improved articulated jib.

Referring now to FIG. 9, a third embodiment of an improved articulated jib is shown. In FIG. 9 like parts have been given like reference numerals as in FIG. 1 with the additional numerical designation "0.2". The third embodiment of the jib 10.2 is generally similar to the first embodiment of the jib 10 with the notable exception that in the third embodiment of the jib 10.2 the lever arm 24.2 comprises four longitudinal frame bars 27, 29, 37 and 39 which are aligned in parallel in a generally quadrate formation. Two of the longitudinal frame bars 27 and 29 are on a first side of the jib 10.2 and are connected at their distal ends by an end link 31. A pin 33 connects a first one of the longitudinal frame bars 27 to the end link 31 and a pin 35 connects a second one of the longitudinal frame bars 29 to the end link 31. The longitudinal frame bars 27 and 29 are also pivotably connected to the base 14.2 by pins 83 and 85, respectively, such that the pins 33, 35, 83 and 85 define the corners of a parallelogram link mechanism 59.

It will be understood that in FIG. 9 only a first side of the jib 10.2 is shown in detail and a second side of the jib 10.2 is a minor image of the first side of the jib 10.2. For example, the longitudinal frame bars 30.2 and 32.2 of the first jib arm 16.1 are on the first side of the jib 10.2 while frame bars 74.2 and 76.2 are on the second side of the jib 10.2. Likewise, the longitudinal frame bars 27 and 29 of the lever arm 24.2 are on the first side of the jib 10.2 while longitudinal frame bars 37 and 39 of the lever arm 24.2 are on the second side of the jib 10.2. Only the first side of the jib 10.2 has been described in detail herein. It will be understood that the second side of the jib 10.2 has a substantially similar structure and functions in a substantially similar manner.

The third embodiment of the jib 10.2 also differs from the first embodiment of the jib 10 in that the linking rod 26.2 is connected to the lever arm 24.2 by a pivot shaft 48.2 which, in this example, extends between the first one of the longitudinal frame bars 27 of the lever arm 24.2 disposed on a first side of the jib 10.2 and a corresponding longitudinal frame bar 37 of the lever arm 24.2 on the second side of the jib 10.2. The linking rod 26.2 is disposed between the longitudinal frame bars 27 and 37. The third embodiment of the jib 10.2 also differs from the first embodiment of the jib 10 in that there is an extension arm 47 extending from the end link 31 at the distal end of the lever arm 24.2. The second counterweight is mounted on the extension arm 47. The extension arm 47 and the end link 31 may be unitary.

Figure 10:
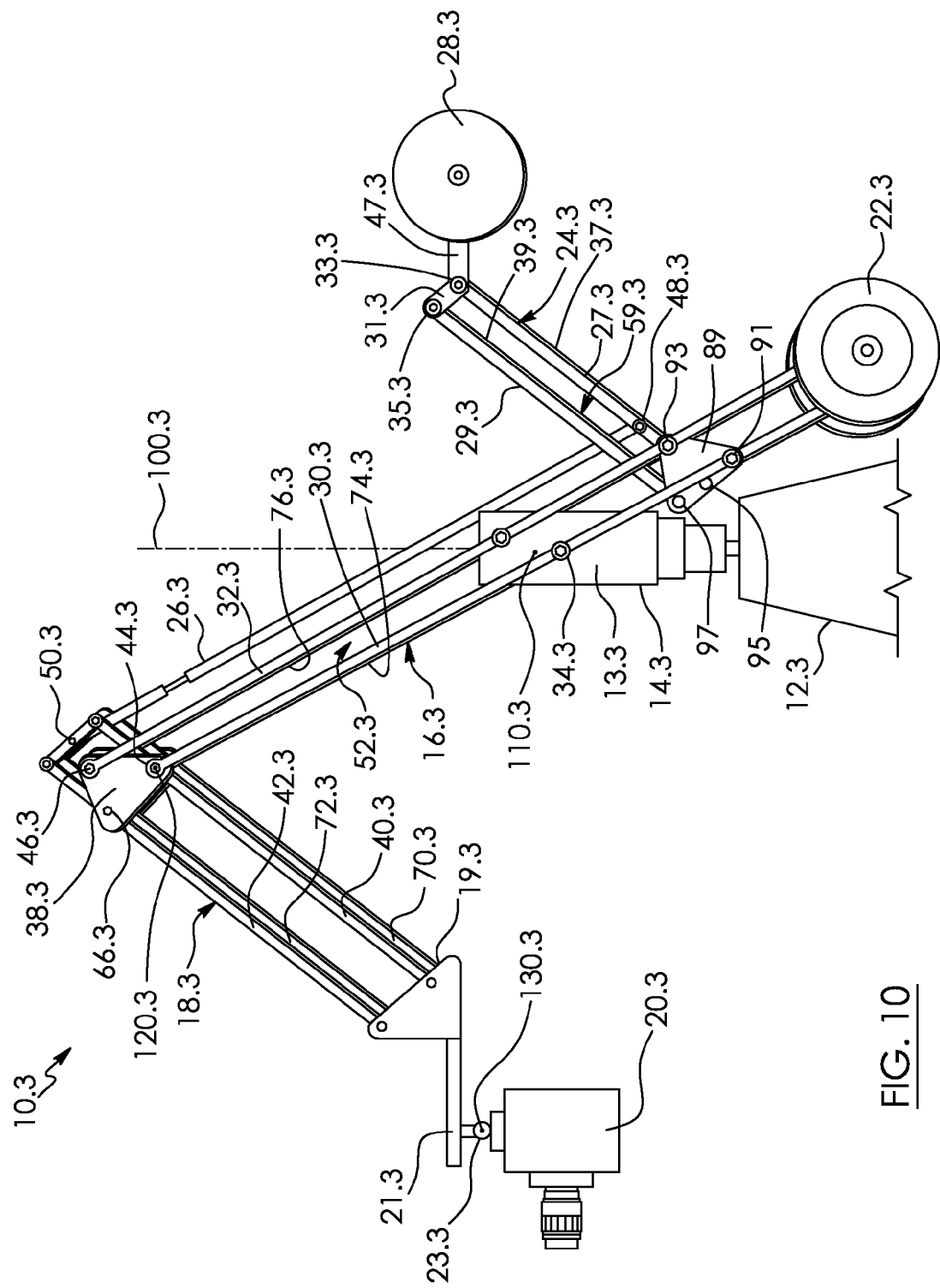
FIG. 10 is an elevation side view of a fourth embodiment of an improved articulated jib.

Referring now to FIG. 10, a fourth embodiment of an improved articulated jib 10.3 is shown. The fourth embodiment of the jib 10.3 is a hybrid of the second embodiment of the articulated jib 10.1 and the third embodiment of the articulated jib 10.2. In FIG. 10 like parts have been given like reference numerals as in FIGS. 7 and 9 with the numerical designation "0.3". Two of the longitudinal frame bars 30.3 and 32.3 of the first jib arm 16.3 on a first side of the jib 10.3 are pivotably connected to a mounting plate 89 by pins 91 and 93, respectively. The pins 91 and 93 together with pivot pins 44.3 and 46.3, which connect the longitudinal frame bars 30.3 and 32.3 of the first jib arm 16.3 on a first side of the jib 10.3 to the connector plate 38.3, define corners of a parallelogram link mechanism 52.3 of the jib 10.3. Two of the longitudinal frame bars 27.3 and 29.3 of the lever arm 24.3 on a first side of the jib 10.3 are pivotably connected to the mounting plate 89 by pins 95 and 97, respectively, such that the pins 33.3, 35.3, 95 and 97 define the corners of a parallelogram link mechanism 59.3. It will be understood that in FIG. 10 only a first side of the jib 10.3 is shown in detail and a second side of the jib 10.3 is a mirror image of the first side of the jib 10.3. It will further be understood that the second side of the jib 10.3 has a substantially similar structure and functions in a substantially similar manner.

During operation of the first embodiment of the jib 10, an operator (not shown) may move the camera 20 to a desired position. The parallelogram link mechanism 52 and first counterweight 22 balance the first jib arm 16 as it is pivoted about the first horizontal pivot axis 110. The second counterweight 28 balances the second jib arm 18 as it is pivoted about the second horizontal axis 120. The camera 20 may thereby be moved, in a balanced manner, toward or away from a stationary object being filmed without requiring movement of the tripod 12. Alternatively, the camera 20 may be moved, in a balanced manner, to follow a moving object being filmed without requiring movement of the tripod 12.

When the jib 10 is set up and balanced, both jib arms 16 and 18 move in unison as a force is applied to the camera 20 at the distal end 19 of the second jib arm 18. The operator does not have to be concerned with positioning one or both of the jib arms 16 and 18. The operator has only to move the camera 20, and the jib 10 follows the camera in a fluid manner as the camera is moved.

With the camera 20 dismounted, that is, with no load on the distal end 19 of the second jib arm 18, no adjustment of the linking rod 26 is required. The length of the linking rod may be set to equal or very slightly less than the length of $D_2$ in FIG. 2. Once counterbalanced by the counterweights 22 and 28, the jib 10 will remain balanced throughout an entire range of movement of the jib 10. The balancing will remain neutral even when the jib 10 is fully extended.

Since the first and second jib arms 16 and 18 are independently counterbalanced, the counterweights 22 and 28 are only a minimal distance from the first and second pivot axes 110 and 120. This allows the jib 10 to be used in restricted spaces commonly found on location in the film industry. The compact design of the jib 10 also allows it to be folded and easily transported between locations. The jib 10 is easily scalable and can therefore be custom manufactured for use with a wide range of cameras including small, lightweight, personal video cameras and large, heavy, motion picture cameras. The simplified structure allows for low cost construction.

The second embodiment of the jib 10.1 provides the further advantage of allowing the camera 20.1 to be counterbalanced with less total weight. This is advantageous in less accessible or remote locations. As it requires greater room to operate in a fully extended position, it is suitable to be used in less restricted spaces, such as exteriors. The fourth embodiment of the jib 10.3 also provides the same advantage.

The third embodiment of the jib 10.2 provides the further advantage of allowing the second counterweight 28.2 to better balance against the camera 20.2 which is mounted on a platform 21.2 which extends from the distal end 19.2 of the second jib arm 18.2. The extension arm 47 on which the second counterweight 28.2 is mounted ensures that the second counterweight 28.2 is positioned to properly balance the camera 20.2. The fourth embodiment of the jib 10.3 also provides the same advantage.

Although in the examples provided herein the jib is used to move a camera, the jib may be used to move any type of load. The jib may also be used to move other types of loads such as magnifying lenses or medical equipment such as operating microscopes. In another embodiment, the jib may be motorized and computer controlled with step motors.

It will be understood by a person skilled in the art that the terms "vertical" and "horizontal" as used herein are used in relation to the orientations described in the Figures and are not intended to limit the scope of the invention.

It will also be understood by a person skilled in the art that many of the details provided above are by way of example only and are not intended to limit the scope of the invention which is to be determined with reference to the following claims.

What is claimed is:

1. An articulated jib for moving a camera, the jib being supported on a base and the jib comprising:
   a first jib arm pivotably connected to the base, the first jib arm functioning as a bascule and being pivotable about a first axis;
   a first counterweight mounted on the first jib arm;
   a second jib arm pivotably connected to the first jib arm by a connector plate, the second jib arm being pivotable about a second axis and the camera being disposed at a distal end of the second jib arm;
   a lever arm pivotably connected to the base and a linking rod connecting the lever arm to the second jib arm, the lever arm extending away from the linking rod towards a distal end of the lever arm, and the linking rod being pivotably connected to the second jib arm;
   a second counterweight mounted on the distal end of the lever arm; and
   wherein the first jib arm includes two parallel frame bars, each of the frame bars being pivotably connected to the base and pivotably connected to the connector plate to form a parallelogram link mechanism, and wherein a full length of the linking rod extending between its points of connection with the second jib arm and the lever arm is equal to or less than a full length of each of the frame bars of the first jib arm between its respective points of connection with the second jib arm and the base.

2. The jib as claimed in claim 1 wherein the linking rod is an adjustable length linking rod.

3. The jib as claimed in claim 2 wherein the linking rod includes two threadedly connected portions and wherein the length of the linking rod may be adjusted by changing an amount which a first said portion of the linking rod is threadedly received by a second said portion of the linking rod.

4. The jib as claimed in claim 1 wherein the base is rotatably mounted on a tripod.

5. The jib as claimed in claim 1 further including an extension arm extending from the distal end of the lever arm, and wherein the second counterweight is mounted on the extension arm.

6. The jib as claimed in claim 1 wherein the lever arm includes two parallel frame bars and a link connecting said parallel frame bars at distal ends thereof, and wherein each of said frame bars is pivotably connected to the link and each of said frame bars is pivotably connected to the base at a proximal end thereof to form a parallelogram link mechanism.

7. The jib as claimed in claim 6 further including an extension arm extending from the link at the distal end of the lever arm, and wherein the second counterweight is mounted on the extension arm.

8. The jib as claimed in claim 7 wherein the link and the extension arm are unitary.

9. An articulated jib for moving a camera, the jib being supported on a base and the jib comprising:
   a first jib arm pivotably connected to the base, the first jib arm functioning as a bascule and being pivotable about a first axis;
   a first counterweight disposed on the first jib arm;
   a second jib arm pivotably connected to the first jib arm by a connector plate, the second jib arm being pivotable about a second axis and the camera being disposed at a distal end of the second jib arm;

a mounting plate disposed on the first jib arm;

a lever arm pivotably connected to the mounting plate and a linking rod connecting the lever arm to the second jib arm, the lever arm extending away from the linking rod towards a distal end of the lever arm, and the linking rod being pivotably connected to the second jib arm;

a second counterweight mounted on the distal end of the lever arm; and wherein the first jib arm includes two parallel frame bars, each of the frame bars being pivotably connected to the connector plate and pivotably connected to the mounting plate to form a parallelogram link mechanism, and wherein a full length of the linking rod extending between its points of connection with the second jib arm and the lever arm is equal to or less than a full length of each of the frame bars of the first jib arm between its respective points of connection with the connector plate and the mounting plate.

10. The jib as claimed in claim 9 wherein the linking rod is an adjustable length linking rod.

11. The jib as claimed in claim 10 wherein the linking rod includes two threadedly connected portions and wherein the length of the linking rod may be adjusted by changing an amount which a first said portion of the linking rod is threadedly received by a second said portion of the linking rod.

12. The jib as claimed in claim 9 wherein the base is rotatably mounted on a tripod.

13. The jib as claimed in claim 9 further including an extension arm extending from the distal end of the lever arm, and wherein the second counterweight is mounted on the extension arm.

14. The jib as claimed in claim 9 wherein the lever arm includes two parallel frame bars and a link connecting said parallel frame bars at distal ends thereof, wherein each of said frame bars is pivotably connected to the link and each of said frame bars is pivotably connected to the mounting plate at a proximal end thereof to form a parallelogram link mechanism.

15. The jib as claimed in claim 14 further including an extension arm extending from the link at the distal end of the lever arm, and wherein the second counterweight is mounted on the extension arm.

16. The jib as claimed in claim 15 wherein the link and the extension arm are unitary.

17. The jib as claimed in claim 9 wherein the mounting plate is disposed on the first jib arm aft of the base.

18. An articulated jib for moving a camera, the jib being supported on a base and the jib comprising:

a first jib arm pivotably connected to the base, the first jib arm functioning as a bascule and being pivotable about a first axis;

a second jib arm pivotably connected to the first jib arm, the second jib arm being pivotable about a second axis and the camera being disposed at a distal end of the second jib arm;

a lever arm pivotably connected to either the base or a mounting plate disposed on the first jib arm and an extension arm extending from a distal end of the lever arm; and a counterweight mounted on the extension arm.

19. The jib as claimed in claim 18 wherein the lever arm includes two parallel frame bars and a link connecting said parallel frame bars at distal ends thereof, wherein each of said frame bars is pivotably connected to the link and each of said frame bars is pivotably connected to the mounting plate at a proximal end thereof to form a parallelogram link mechanism.

20. The jib as claimed in claim 19 further including an extension arm extending from the link at the distal end of the lever arm, and wherein the counterweight is mounted on the extension arm.

* * * * *